United States Patent
Sanghvi

(10) Patent No.: US 7,872,825 B2
(45) Date of Patent: Jan. 18, 2011

(54) DATA STORAGE DRIVE WITH REDUCED POWER CONSUMPTION

(75) Inventor: Sumeet Sanghvi, Santa Clara, CA (US)

(73) Assignee: Agere Systems Inc., Allentown, PA (US)

(*) Notice: Subject to any disclaimer, the term of this patent is extended or adjusted under 35 U.S.C. 154(b) by 327 days.

(21) Appl. No.: 12/095,380

(22) PCT Filed: Aug. 20, 2007

(86) PCT No.: PCT/US2007/076281

§ 371 (c)(1),
(2), (4) Date: May 29, 2008

(87) PCT Pub. No.: WO2009/025664

PCT Pub. Date: Feb. 26, 2009

(65) Prior Publication Data

US 2010/0142075 A1    Jun. 10, 2010

(51) Int. Cl.
*G11B 5/02* (2006.01)
(52) U.S. Cl. .............. 360/67; 360/51; 360/69
(58) Field of Classification Search .............. None
See application file for complete search history.

(56) References Cited

U.S. PATENT DOCUMENTS

| | | | |
|---|---|---|---|
| 5,359,298 A * | 10/1994 | Abe | 331/2 |
| 5,367,638 A * | 11/1994 | Niessen et al. | 710/57 |
| 5,402,200 A | 3/1995 | Shrinkle et al. | |
| 5,999,353 A * | 12/1999 | Hase et al. | 360/51 |
| 6,327,638 B1 | 12/2001 | Kirby | |
| 6,425,086 B1 * | 7/2002 | Clark et al. | 713/322 |
| 6,865,653 B2 * | 3/2005 | Zaccarin et al. | 711/154 |
| 7,536,567 B2 * | 5/2009 | Bonola et al. | 713/300 |
| 7,551,383 B1 * | 6/2009 | Kupferman | 360/51 |
| 7,583,555 B2 * | 9/2009 | Kang et al. | 365/226 |
| 7,606,151 B2 * | 10/2009 | Chilukoor | 370/230 |
| 2003/0161245 A1 * | 8/2003 | Henrichs | 369/95 |
| 2005/0240784 A1 | 10/2005 | Sugasawa | |
| 2005/0278463 A1 * | 12/2005 | Ando | 710/8 |

FOREIGN PATENT DOCUMENTS

WO    WO2004061843    7/2004

OTHER PUBLICATIONS

International Search Report, PCT/US2007/076281, May 7, 2008.

* cited by examiner

*Primary Examiner*—Hoa T Nguyen
*Assistant Examiner*—James L Habermehl
(74) *Attorney, Agent, or Firm*—Ryan, Mason & Lewis, LLP

(57) ABSTRACT

A data storage drive comprises a storage disk, a read/write head, and signal processing circuitry in signal communication with the read/write head. The read/write head is operative to read data from and write data to the storage disk at a plurality of data transfer rates. Moreover, the signal processing circuitry is powered by a variable power source. The variable power source varies supply voltage to the signal processing circuitry as a function of a current one of the data transfer rates of the read/write head. Power consumption is reduced in this manner.

20 Claims, 7 Drawing Sheets

| | | | | FREQUENCY IN MHz |
|---|---|---|---|---|
| ZONE 00: | 0000A–01A11 | 1120 | (0460) | 532.258 |
| ZONE 01: | 01A12–03386 | 1120 | (0460) | 532.258 |
| ZONE 02: | 03387–04648 | 1092 | (0444) | 518.951 |
| ZONE 03: | 04649–05F8C | 1050 | (041A) | 500.806 |
| ZONE 04: | 05F8D–0810B | 1008 | (03F0) | 475.403 |
| ZONE 05: | 0810C–093CD | 966 | (03C6) | 460.645 |
| ZONE 06: | 093CE–0ADD5 | 924 | (039C) | 439.950 |
| ZONE 07: | 0ADD6–0C46B | 882 | (0372) | 421.935 |
| ZONE 08: | 0C46C–0E2A9 | 840 | (0348) | 397.379 |
| ZONE 09: | 0E2AA–0F3E3 | 798 | (031E) | 382.258 |
| ZONE 0A: | 0F3E4–10C63 | 756 | (02F4) | 361.583 |
| ZONE 0B: | 10C64–121D3 | 714 | (02CA) | 342.580 |
| ZONE 0C: | 121D4–1389A | 672 | (02A0) | 319.354 |
| ZONE 0D: | 1389B–1484C | 630 | (0276) | 304.838 |
| ZONE 0E: | 1484D–156D8 | 604 | (025C) | 292.741 |
| ZONE 0F: | 156D9–1612E | 560 | (0230) | 271.536 |

FIG. 11

| ZONE | WORST CASE Vdd (V) |
|---|---|
| 00 | *** |
| 01 | *** |
| 02 | *** |
| 03 | *** |
| 04 | *** |
| 05 | *** |
| 06 | *** |
| 07 | *** |
| 08 | *** |
| 09 | *** |
| 0A | *** |
| 0B | *** |
| 0C | *** |
| 0D | *** |
| 0E | *** |
| 0F | *** |

| OSCILLATOR FREQUENCY (MHz) | Vdd BIAS TERM (V) |
|---|---|
| OSC0 | 0 (ZERO) |
| OSC1 | *** |
| OSC2 | *** |
| OSC3 | *** |
| OSC4 | *** |
| OSC5 | *** |
| OSC6 | *** |
| OSC7 | *** |

— 430

DATA STORAGE DRIVE WITH REDUCED POWER CONSUMPTION

FIELD OF THE INVENTION

The present invention relates generally to data storage drives, and, more particularly, to data storage drives such as hard disk drives with reduced power consumption characteristics.

BACKGROUND OF THE INVENTION

Hard disk drives (HDDs) are used extensively in modem data processing systems for nonvolatile data storage. A typical HDD design consists of a spindle which holds one or more flat circular storage disks (also called platters). Each storage disk is made from a non-magnetic material, usually glass or aluminum, and is coated with a thin layer of magnetic material. Data is written to and read from the storage disk by spinning it at high speed and using a read/write (r/w) head to detect and modify the magnetization of the magnetic material on the surface of the storage disk immediately underneath the r/w head. An actuator arm precisely moves the r/w head on an arc across the storage disk as it spins, allowing the head to access almost the entire surface of the storage disk.

Unfortunately, in large part due to their moving parts, conventional HDDs typically consume a relatively large amount power when compared to other components in data processing systems. In portable data processing systems that utilize batteries, such as laptop computers, this frequently results in short battery durations. As a result, there have been several approaches to reducing power consumption in HDDs. One approach, for example, is to simply power down an HDD whenever immediate access to its stored data is not anticipated. Another approach is to reduce the power consumption of the HDD's electromechanical components by using, for example, full step-per-track actuators to move the r/w heads and low torque spindle motors to spin the storage disks. Nevertheless, these approaches usually have negative performance and reliability consequences. Powering down an HDD may lead to delayed data access times. Using lower power electromechanical components may result in reduced drive life.

As a result, there remains a need for novel HDD designs that provide reduced power consumption characteristics when compared to conventional HDD designs without substantially detracting from HDD performance and reliability.

SUMMARY OF THE INVENTION

Embodiments of the present invention address the above-identified need by providing HDD designs that offer reduced power consumption characteristics when compared to conventional HDD designs. This is accomplished in part by varying the supply voltage to circuitry within the HDD in response to changes in data transfer rate (DTR) as different regions of the HDD's storage disk are accessed.

In accordance with an aspect of the invention, a data storage drive comprises a storage disk, a r/w head, and signal processing circuitry in signal communication with the r/w head. The r/w head is operative to read data from and write data to the storage disk at a plurality of DTRs. Moreover, the signal processing circuitry is powered by a variable power source. The variable power source varies supply voltage to the signal processing circuitry as a function of a current one of the DTRs of the r/w head.

In accordance with one of the above-identified embodiments of the invention, an HDD comprises a storage disk, a r/w head, and digital signal processing circuitry that is utilized to process signals for read and write operations. Because the storage disk spins at a constant angular velocity, the DTR at the HDD's r/w head changes as the HDD accesses different regions of the disk. Lookup tables are utilized to modify the supply voltage as the DTR changes. For each DTR, the supply voltage is set to a value that allows the digital signal processing circuitry to operate at a frequency equal to or slightly higher than the current DTR. The supply voltage to the signal processing circuitry is, in this way, varied as the HDD accesses different regions of its storage disk rather than being held at a constant voltage. Advantageously, this substantially improves the power consumption characteristics of the HDD.

These and other features and advantages of the present invention will become apparent from the following detailed description which is to be read in conjunction with the accompanying drawings.

BRIEF DESCRIPTION OF THE DRAWINGS

FIG. 11 shows a worst case supply voltage lookup table for use in the FIG. 1 HDD.

FIG. 12 shows a supply voltage bias term lookup table for use in the FIG. 1 HDD.

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

Figure 1:
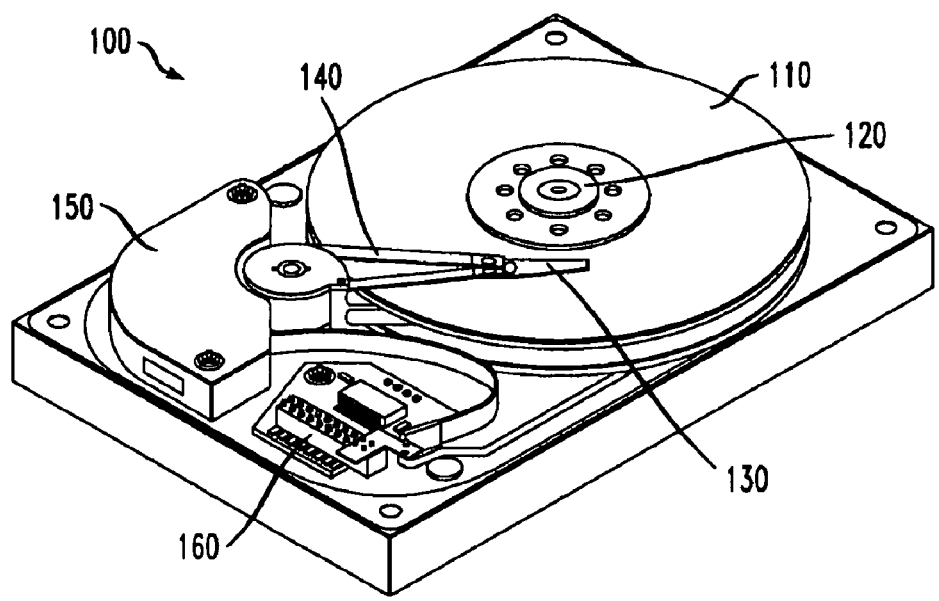
FIG. 1 shows a perspective view of an HDD in accordance with an illustrative embodiment of the invention.

FIG. 1 shows a perspective view of an HDD 100 in accordance with an illustrative embodiment of the invention. The HDD comprises a conventional storage disk 110 which is coated with a magnetic media. The storage disk is connected to a spindle 120 driven by a spindle motor (not shown) that is used to spin the storage disk at high speed. A conventional electromagnetic r/w head 130 is mounted on a positioning arm 140 and acts to write encoded data to the magnetic surface of the storage disk and to read previously stored data. The positioning arm is precisely positioned over the storage disk by a conventional electromechanical actuator 150. Circuitry 160, only partially shown, serves to control the other components of the HDD, to accomplish signal processing tasks, and to communicate data between the HDD and whatever data processing system the HDD is servicing.

While the illustrative HDD 100 comprises only a single storage disk 110 and r/w head 130, this is largely for ease of explanation and aspects of the invention can readily be applied to an HDD comprising several storage disks and r/w heads. Modern HDDs frequently utilize more than one storage disk and r/w head in order to provide greater storage capacity and faster access speeds. The multiple storage disks are usually attached to a single spindle so that they rotate at the same speed and are actuated by a single spindle motor. The actuator arms of the multiple r/w heads are also attached to each other so that the r/w heads move in unison.

Figure 2:
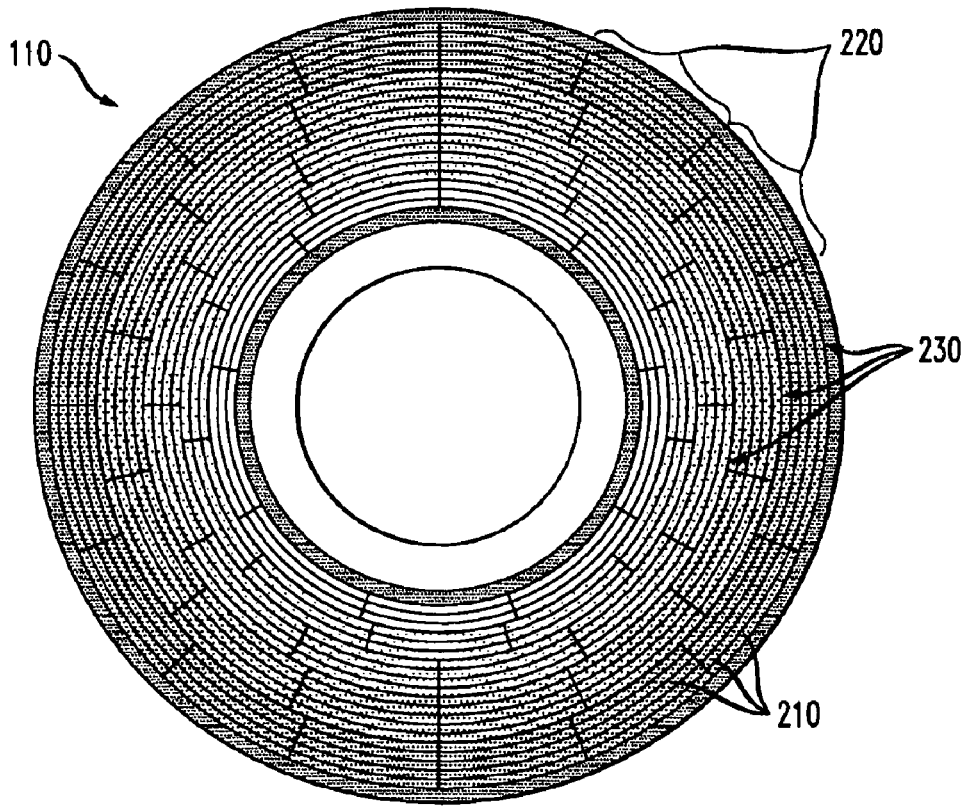
FIG. 2 shows a plan view of a storage disk in the FIG. 1 HDD.

The recording surface of the storage disk 110 is shown in FIG. 2. As is conventional, it consists of a series of concentric tracks 210. Each track is subdivided into a plurality of equally sized sectors 220 which are capable of storing a block of data for subsequent retrieval. The tracks located toward the outside edge of the storage disk have a larger circumference when compared to those located toward the center of the storage disk (i.e., those tracks located closer to the spindle 120). As a result the tracks are grouped into several annular zones 230, where the tracks within a given one of the zones have the same number of sectors. Those tracks in the outer zones have more sectors than those located in the inner zones. This configuration is frequently called a "Zoned Bit Recording" or "Zoned Density Recording" arrangement.

The outer zones 230 of the storage disk 110 provide a higher DTR than inner zones for two reasons. First, the angular velocity of the storage disk is greater as one moves to zones located toward its outside edge because the storage disk spins at a constant speed that is independent of where a read or write operation is occurring on its surface. This mode of operation is frequently called a constant angular velocity (CAV) operation and distinguishes most HDDs from optical data storage drives (e.g., compact disc (CD) and digital versatile disc (DVD)) which typically are operated using a constant linear velocity (CLV) mode of operation. As a result, a greater amount of surface area per second passes under the r/w head 130 in the outer zones of the storage disk than in the inner zones. Second, since each outer zone stores more data than inner zones, the r/w head need not be moved as frequently to read a given amount of data when accessing data in the outer zones. Large data transfers to or from tracks in outer zones can therefore sustain a higher DTR than transfer to or from tracks in inner zones.

Figure 3:
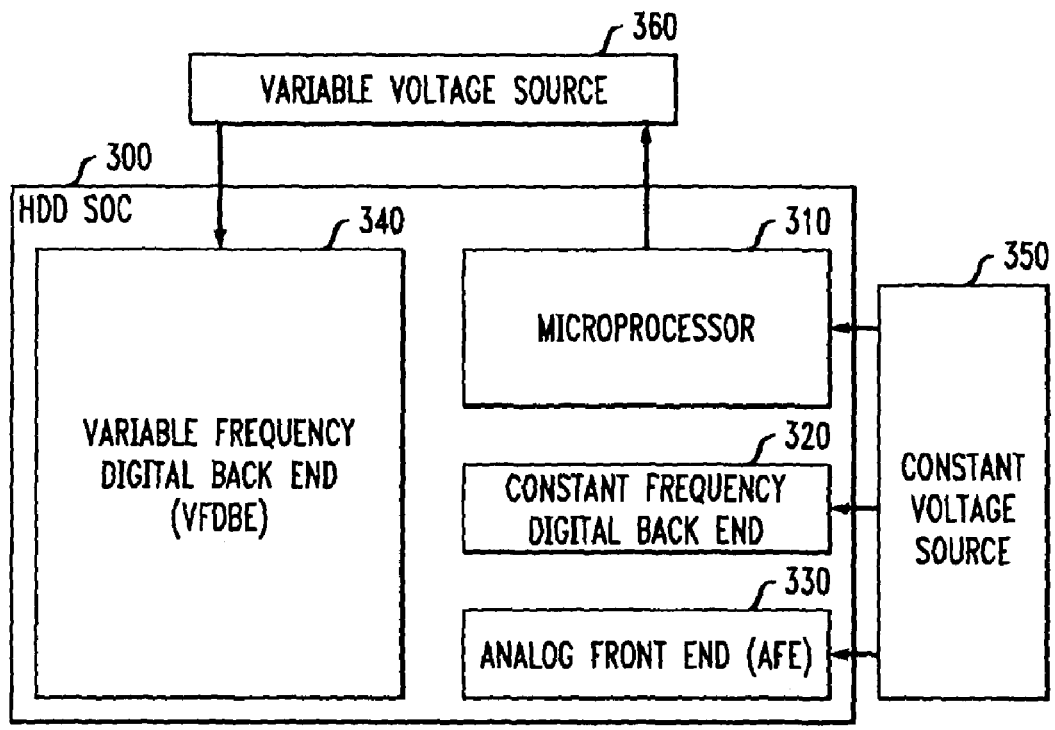
FIG. 3 shows a block diagram of a system-on-chip (SOC) in the FIG. 1 HDD.

FIG. 3 shows a block diagram of an illustrative system-on-chip (SOC) 300 that forms part of the circuitry 160 in the HDD 100. The SOC consists of a single integrated circuit that can be divided into several functional portions, more specifically, a microprocessor portion 310, a constant frequency digital back end portion 320, an analog front end (AFE) portion 320, and a variable frequency digital back end (VFDBE) portion 340. As indicated in the figure, the microprocessor portion, the constant frequency digital back end portion, and the AFE portion are powered by a constant voltage source 350, while the VFDBE portion is powered by a variable voltage source 360. The microprocessor portion serves to control several of the functions of the HDD and to perform various data processing tasks that allow the HDD to communicate with the data processing system the HDD is servicing. Moreover, the microprocessor portion is operative to control the voltage output of the variable voltage source, which is described in greater detail below. The constant frequency digital back end portion, in contrast, is responsible for controlling the spindle motor. Finally, the AFE and VFDBE portions comprise signal processing circuitry.

Variable voltage sources such as the variable voltage source 360 in the HDD 100 are not typically found in conventional HDDs but are commercially available and will be familiar to one skilled in the art. The variable voltage source will preferably be one that is programmable, meaning that its voltage output is based on one or more control signal inputs. Such a variable programmable voltage source may comprise, for example, an LTC1736 Switching Regulator from Linear Technology Corporation of Milpitas, Calif., USA. The LTC1736 accepts a digital control input and provides an output voltage of up to 2 V based on the input. The variable voltage source may be external to the HDD SOC 300 or, alternatively, may be built directly into the SOC integrated circuit.

Figure 4:
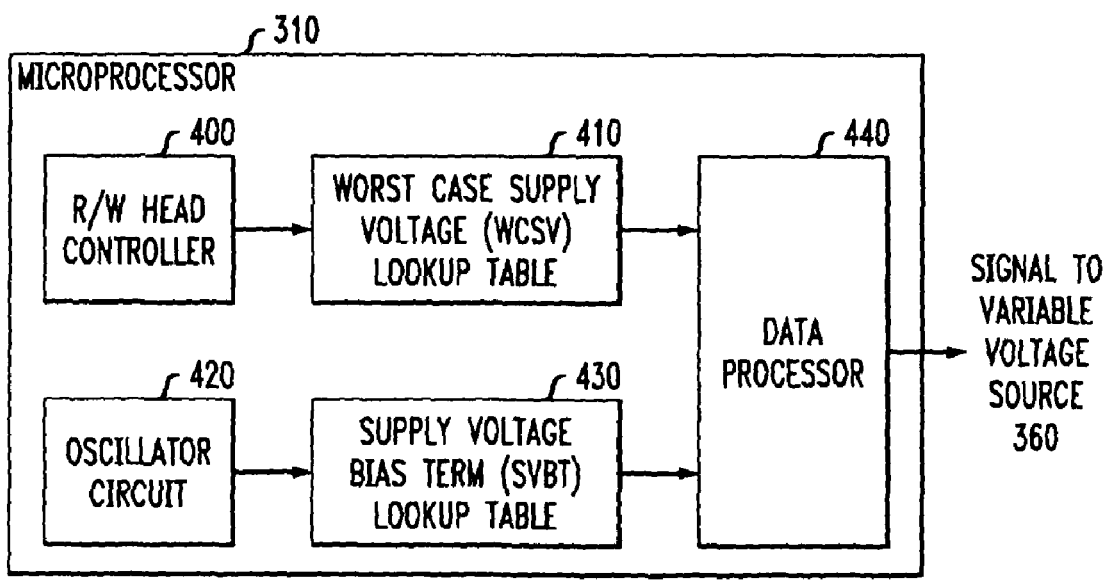
FIG. 4 shows a block diagram of the microprocessor in the FIG. 3 SOC.

Some of the elements that form the microprocessor portion 310 of the HDD SOC 300 are further detailed in the block diagram shown in FIG. 4. These elements include a r/w head controller 400, a worst case supply voltage (WCSV) lookup table 410, an oscillator circuit 420, a supply voltage bias term (SVBT) lookup table 430, and a data processor 440.

Figure 5:
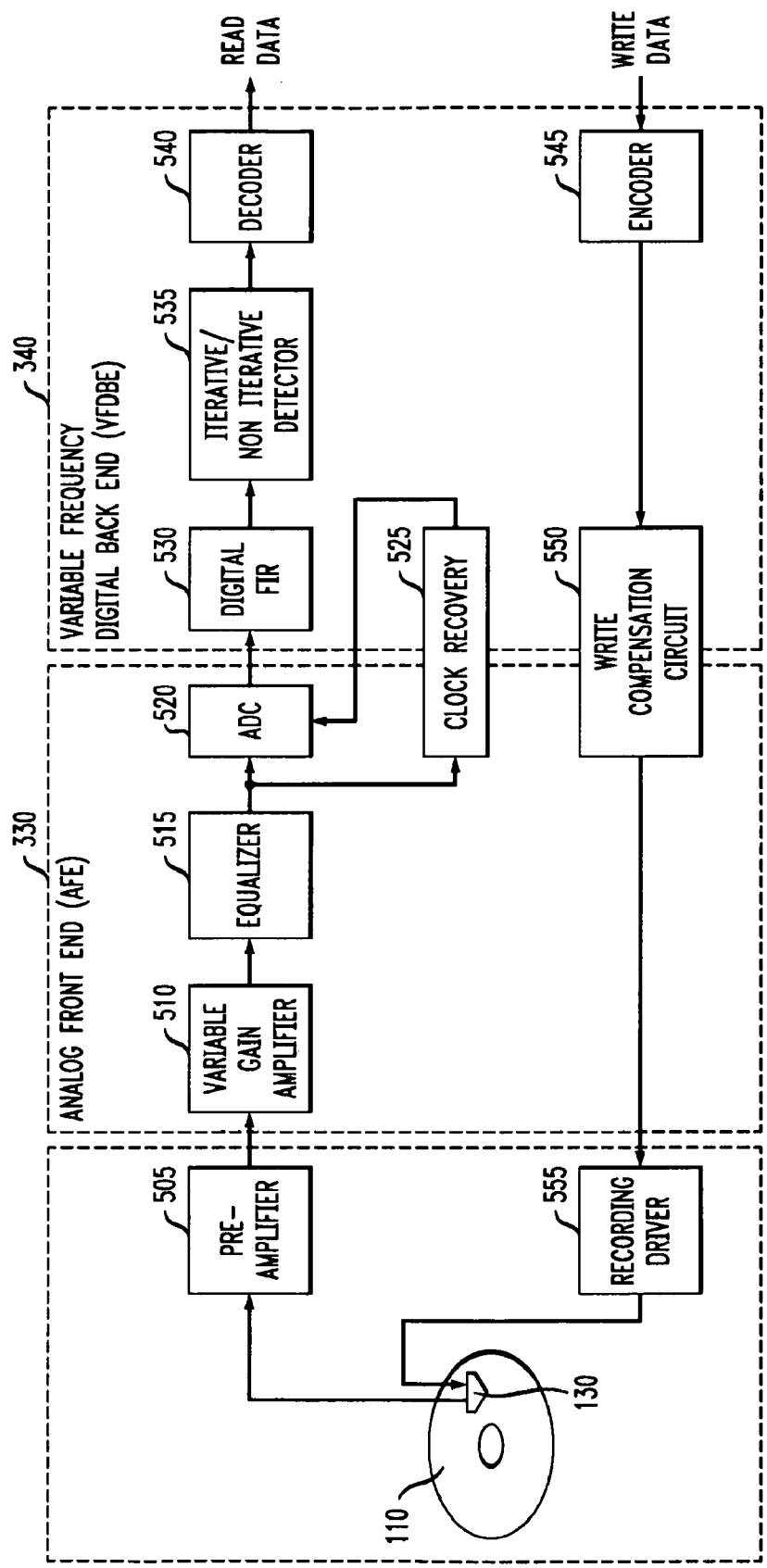
FIG. 5 shows a block diagram of signal processing circuitry in the FIG. 3 SOC.

In addition, some of the signal processing elements that form the AFE and the VFDBE portions 330, 340 of the HDD SOC 300 are further detailed in the block diagram shown in FIG. 5. Analog elements in the signal processing circuitry are contained in the AFE portion, while digital elements are contained in the VFDBE portion. These analog and digital elements are conventionally used in HDDs and, as a result, their design and function will be familiar to one skilled in the art. Briefly, during read operations, analog signals from the r/w head 130 pass through a pre-amplifier 505, a variable gain amplifier 510, and an equalizer 515 which prepare the analog signals for analog-to-digital conversion in an analog-to-digital converter (ADC) 520. During analog-to-digital conversion, the DTR of the data is determined using a clock recovery element 525 so that a synthesized clock with a frequency that matches the DTR can be applied to the digital circuitry in the VFDBE portion of the HDD SOC. After analog-to-digital conversion in the ADC, the now-digital signal is passed through a digital Finite Input Response (FIR) filter 530, an iterative or non-iterative detector 535, and finally through a decoder 540 so that the digital signal is converted into a series of digital bits that can be transmitted to data processing elements external to the HDD 100. Writing data to the storage disk involves taking digital data and converting it into analog signals that can be used to pattern the magnetic surface of the storage disk 110. In this case, digital data is received by the HDD and sent through an encoder 545 and write compensation circuit 550. Finally a recording driver 555 acts to cause the r/w head to encode the appropriate magnetic pattern onto the magnetic surface of the storage disk.

Figure 6:
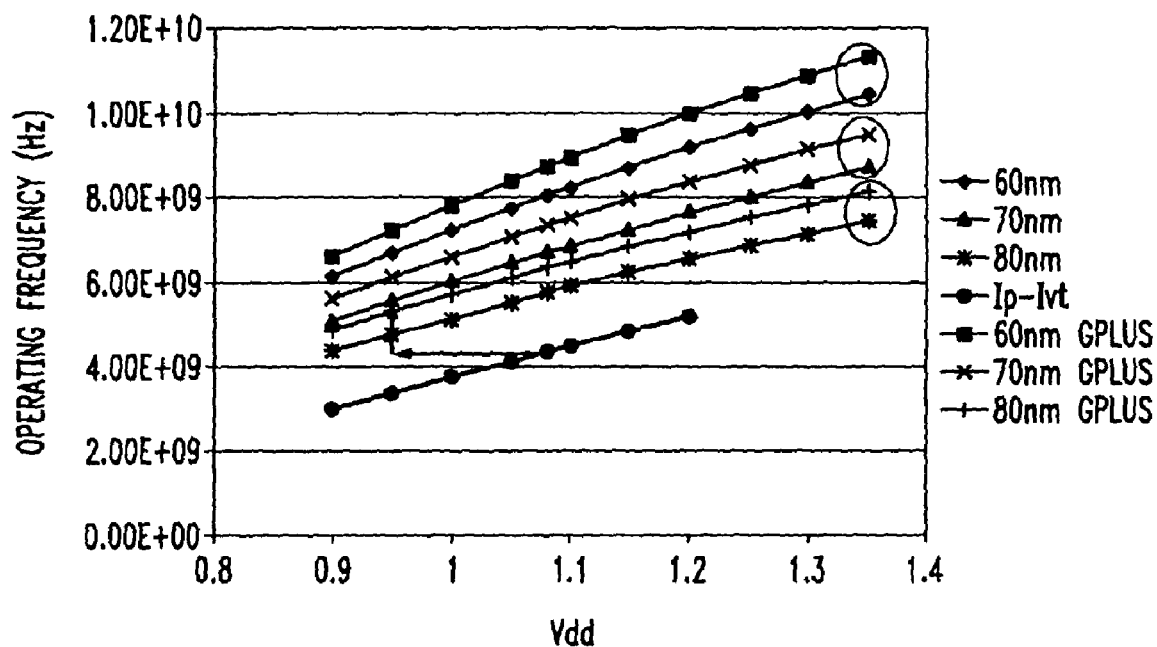
FIG. 6 shows a chart of operating frequency versus supply voltage for test structures.

As mentioned above, the signal processing circuitry of the VFDBE portion 340 of the HDD SOC 300 (hereinafter called the "digital signal processing circuitry") runs on a synthesized clock that is synchronized to the current DTR provided by the r/w head 130. This digital signal processing circuitry is preferably formed using complimentary metal-oxide-semiconductor (CMOS) technology, as is customary for modern HDDs. The gate propagation time delay, tpd, of a metal-oxide-semiconductor field effect transistor (MOSFET) in CMOS technology may be approximated by the following expression:

$$tpd = C \times Vdd \times (Vdd - Vt)^{\alpha},$$

where C is the output load capacity on the MOSFET, Vdd is the supply voltage, Vt is the threshold voltage, and α is a factor depending on the generation of the device ($1 \leq \alpha \leq 2$). The gate propagation time is, of course, inversely related to the maximum operating frequency of the MOSFET. This relationship between operating frequency (i.e., speed) and Vdd is demonstrated by actual hardware in FIG. 6. FIG. 6 shows a chart of operating frequency versus Vdd for inverter chain test structures containing MOSFETs of various channel lengths from 60 to 80 nm. The "GPLUS" designation indicates that the associated inverter chain test structure is formed in accordance with new MOSFET designs available from a particular foundry, while the "lp-lvt" designation indicates that the associated inverter chain test structure comprises low threshold voltage devices. While the values of the operating frequencies of the different inverter chain test structures are different from each other at any given Vdd, the slope of operating frequency versus supply voltage is largely the same for all the test structures. More specifically, in each test structure, the operating frequency drops by about a factor of two when reducing Vdd from about 1.4 V to about 0.85 V.

Figure 7:
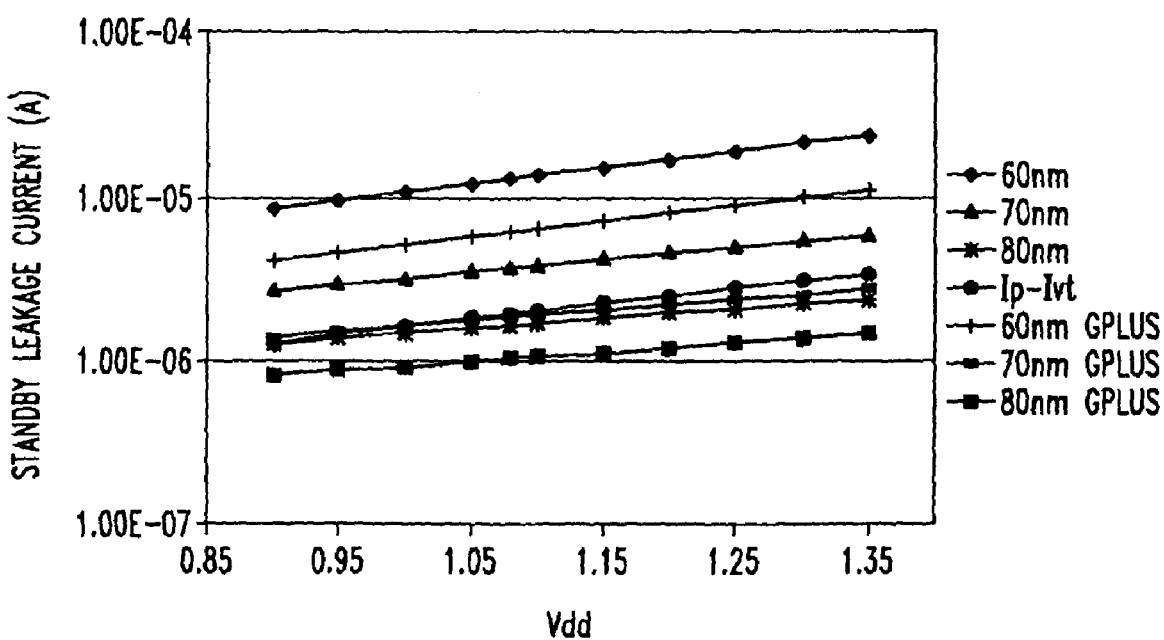
FIG. 7 shows a chart of standby leakage current versus supply voltage for test structures.

Furthermore, the power consumption, P, of a MOSFET in CMOS technology may be approximated by the following expression:

$$P = K \times C \times Vdd \times f + Ileak \times Vdd,$$

where K is the switching probability, f is the operating frequency, and Ileak is the subthreshold leakage current. Ileak is also itself a function of Vdd. FIG. 7 shows Ileak as a function of Vdd for the same inverter chain test structures that are shown in FIG. 6. Here too, the slope of the curves are substantially the same for each test structure, with Ileak dropping monotonically as the supply voltage is reduced from 1.4 V to 0.85 V. As a result, both dynamic power consumption (i.e., power consumption while the MOSFETs of the inverter chain test structures are actively being switched) and standby power consumption (i.e., power consumption while the MOSFETs are not actively being switched) also drop off substantially in the inverter chain test structures as Vdd is reduced. In fact, across the range of Vdd measured here, dynamic power consumption in the test structures is reduced by about 34% and standby leakage power consumption is reduced by about 49%.

The above-described relationships of operating frequency and power consumption to Vdd provide an opportunity to substantially reduce power consumption in HDDs. As mentioned above, the digital signal processing circuitry of the HDD 100 runs on a synthesized clock that is synchronized with the DTR currently provided by the r/w head 130. Therefore, at any given time, this circuitry only needs to be supplied with a Vdd that allows it to operate at an operating frequency equal to that of the current DTR. Since the DTR changes as a function of which zone 230 the r/w head is accessing, substantial power savings can be had by varying Vdd in response to changes in DTR as the r/w head is moved. In other words, substantial power savings can be achieved by dynamically reducing Vdd when the r/w head accesses a zone with a slower DTR (e.g., an inner zone of the storage disk 110) and increasing Vdd when the r/w head accesses a zone with a higher DTR (e.g., an outer zone of the storage disk).

Figure 8:
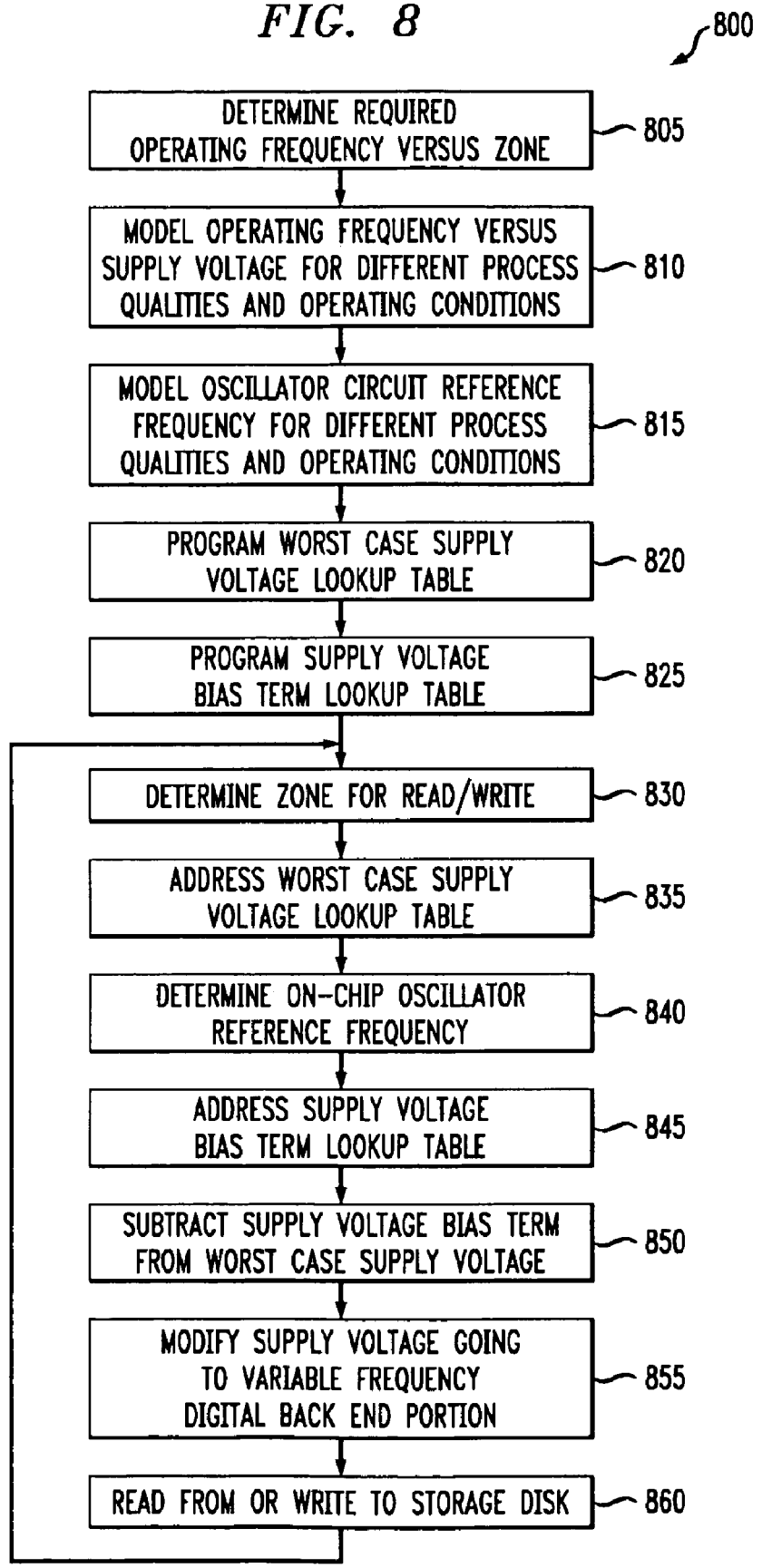
FIG. 8 shows a flow diagram of a method for varying supply voltage as a function of zone in the FIG. 1 HDD.

FIG. 8 shows a method 800 for doing just this type of varying of Vdd using the HDD 100 as it is described above. It should be emphasized, however, that this method is merely illustrative and is not the only method that will fall within the scope of the invention. The method 800 starts with several set-up steps described by steps 805-825. These set-up steps are preferably performed by a manufacturer of the HDD before delivery to an end user. After the set-up steps are performed, the HDD repeatedly performs a sequence of steps as the HDD performs routine read and write operations. This repeating sequence of steps is shown in the FIG. 8 as steps 825-860.

In step 805, the manufacturer determines the DTR for each zone 230 on the storage disk 110 of the HDD 100. The DTR for a particular HDD is a function of an optimization process which attempts to maximize bit density and performance and which will be familiar to one skilled in the art. The results of this process are shown in the table in FIG. 9. In this case, the storage disk has been partitioned into 16 zones. The fastest zones, zones 00 and 01 near the outer edge of the storage disk, have a DTR of about 532 MHz. The slowest zones, zones 0E and 0F near the center of the storage disk, in contrast, have a DTR of only about 293 MHz and 271 MHz, respectively. Thus, DTR varies by almost a factor of two when moving from outer zones to inner zones.

As stated above, the variable Vdd while accessing a particular zone is preferably set such that the digital signal processing circuitry of the HDD SOC 300 is at least capable of running at an operating frequency equal to the DTR for that zone. This allows Vdd to be set to a different value for each of the DTRs determined in step 805. However, finding the precise Vdd for each DTR for a given HDD SOC is complicated by the fact that the operating frequency of the digital signal processing circuitry at a given Vdd may vary from one HDD SOC to another HDD SOC even if the HDD SOCs have identical designs. This variation occurs as a normal result of process variations during integrated circuit formation (i.e., differences in "process quality") and differences in operating conditions (e.g., temperature). It may be possible, for example, for the digital signal processing circuitry of one HDD SOC to be 40% faster than that of a different HDD SOC even when both sets of signal processing circuitry are powered by the same Vdd and have identical designs.

Figures 9, 10:
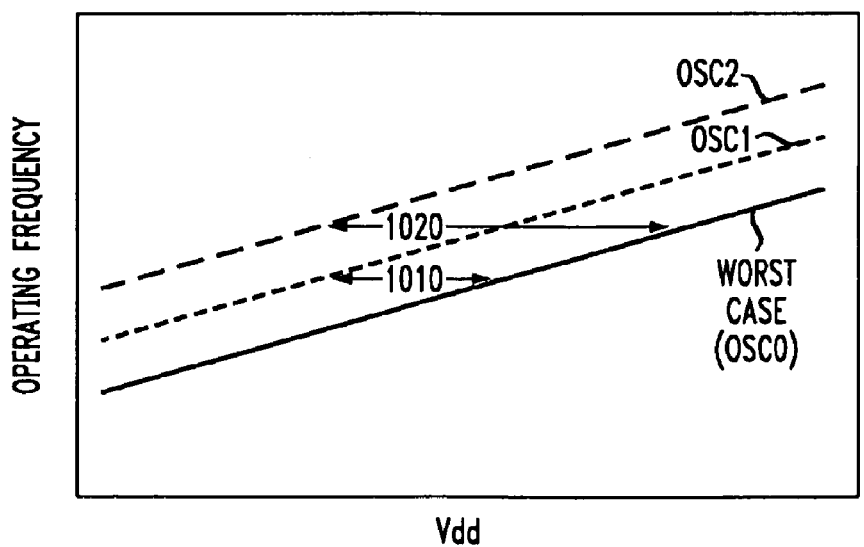
FIG. 9 shows a table of DTR versus zone in the FIG. 1 HDD.
FIG. 10 shows a chart of operating frequency versus supply voltage in the FIG. 1 HDD.

The determination of operating frequency versus Vdd is preferably performed in step 810 by modeling the design of the digital signal processing circuitry using conventional circuit modeling techniques, although, it may also be accomplished by measuring real hardware. The commercially available design software PrimeTime® from Synopsys®, Inc. of Mountain View, Calif., USA, for example, allows this kind of modeling. More particularly, such modeling software allows the operating frequency of the digital signal processing circuitry of the HDD SOC 300 to be modeled as function of Vdd for different process qualities and operating conditions. FIG. 10 shows a chart of the results of such modeling for the HDD 100. The lowest curve shows operating frequency versus Vdd for what the manufacturer considers to be the worst case process quality and operating conditions (i.e., the worst case corner of the process-quality/operating-condition space). The remaining two sets of data show operating frequency versus Vdd for sets of signal processing circuitry with somewhat better process quality and operating conditions. Here, only three sets of data are shown, but, of course, the manufacturer is free to generate as many sets of data as the manufacturer desires.

After modeling the digital signal processing circuitry of the HDD SOC 300 at different process qualities and operating conditions, the operating frequency of the oscillator circuit 420 is also modeled (or measured using actual hardware) in step 815 for the same process qualities and operating conditions used in step 810. The oscillator circuit may be configured as, for example, a simple ring oscillator that runs under a constant supply voltage provided by the constant voltage source 350. The purpose of the oscillator circuit is to act as a reference that indicates what particular process quality any particular HDD SOC possesses and under what operating conditions it is currently functioning. As a result of this additional modeling (or measurements), each set of data in the FIG. 10 can be assigned an associated oscillator circuit reference frequency. For example, the worst case set of data is assigned an oscillator frequency of OSC0. The next best set of data is assigned an oscillator circuit reference frequency of OSC 1, and soon.

Step 820 involves programming the WCSV lookup table 410. Such a lookup table is shown in FIG. 11. It relates a Vdd to each of the 16 zones of the storage disk 110 for a HDD SOC with worst case process quality and operating conditions. The data in this table can be gleaned directly from the lowest curve in FIG. 10.

In step 825, the SVBT lookup table 430 is programmed. This second lookup table is shown in FIG. 12 and relates Vdd bias terms to respective oscillator circuit reference frequencies. In this case, there are eight rows in the table, although this number is merely arbitrary. Like the entries in the WCSV lookup table 410, the data in the SVBT lookup table may also be determined from the data in FIG. 10. More precisely, the Vdd bias term is equal to the horizontal offset between a curve with a given oscillator circuit reference frequency and the worst case curve (i.e., the bottom set of data in the figure). For example, the Vdd bias term associated with the oscillator circuit reference frequency OSC1 is shown by the horizontal arrow 1010 in the figure. The Vdd bias term for the OSC2 curve is shown by the horizontal arrow 1020.

With these set-up steps completed, the series of steps associated with routine read and write operations may be repeatedly performed as the r/w head 130 accesses different zones 230 on the storage disk 110. In step 830, the next zone to be accessed is determined by the r/w head controller 400. This zone information is used to address the WCSV lookup table 410 in step 835 in order to determine a worst case Vdd.

Next, in step 840 the oscillator circuit reference frequency of the HDD SOC 300 is determned. Like the zone information from the r/w head controller 400, this oscillator circuit reference frequency information is also used to address a lookup table, in this case the SVBT lookup table 430, as indicated in step 845. The result of this lookup is a Vdd bias term. Both this Vdd bias term and the worst case Vdd determined in step 835 are then fed to the data processor 440. In step 850, the data processor subtracts the Vdd bias term from the worst case Vdd to determine the "minimum" Vdd to be used while the next zone is accessed. This minimum Vdd should allow the signal processing circuitry of the VFDBE portion 340 to function with an operating frequency equal to that of the DTR for the next zone.

In step 855, the data processor 440 sends a control signal (analog or digital) to the variable voltage source 360 appropriate to cause the variable voltage source to output the minimum Vdd to the VFDBE portion 340 of the HDD SOC 300. The particular form of the control signal will be specific to the type of variable power source. With Vdd changed in this manner, the r/w head 130 reads from or writes to the storage disk 110 in step 860. With this accomplished, the method returns to step 830 so that Vdd can be adjusted again when another zone 230 is accessed.

It is noted, that the minimum Vdd need not be determined precisely in the manner described above to fall within the scope of the invention. An alternative method to combining values from two lookup tables when determining the minimum Vdd in the manner described above may comprise, for example, addressing a different lookup table for each oscillator circuit reference frequency. Nonetheless, such an alternative method may significantly add to storage capacity demands on the HDD SOC 300.

It is further noted that it may be preferable to have the data processor 440 add a safety margin to the minimum Vdd determined in step 850 before sending this value to the variable voltage source 360 in step 855. Such a safety margin would help to assure that the digital signal processing circuitry is capable of matching the DTR of the r/w head 130 during the subsequent read or write operation. Such a safety margin could be equal to, for example, 10% of the difference between the worst case Vdd and the Vdd bias term determined in the previous steps, although any other appropriate value for the safety margin could be used. It is further noted that it may be preferable to select the next lower oscillator frequency entry in the SVBT lookup table 430 in step 845 when the oscillator circuit reference frequency falls between values in this lookup table. This also adds a margin of safety to the minimum Vdd used to power the digital signal processing circuitry.

The WCSV lookup table 410 and the SVBT lookup table 430 can take a number of physical forms. They may, for example, be implemented in the form of firmware on the HDD SOC 300 such as in one or more read-only memories (ROMs), flash memories, programmable ROMs (PROMs), erasable programmable ROMs (EPROMs), or electrically erasable programmable ROMs (EEPROMs). Alternatively or additionally, they may be in programmed into software.

The circuitry constituting the VFDBE portion of a HDD SOC typically comprises about half of the circuitry in the HDD SOC. As a result, substantial power savings can be achieved using methods in accordance with aspects of this invention like the method 800 described with reference to FIG. 8. The particular power savings will ultimately depend on the distribution of data on the one or more storage disks in a given HDD and the temporal pattern in which this data is accessed. Nonetheless, power savings of 50% can frequently be achieved.

It should again be emphasized that the above-described embodiments of the invention are intended to be illustrative only. Other embodiments can use different types and arrangements of elements, control mechanisms, and steps for implementing the described functionality. These numerous alternative embodiments will fall within the scope of this invention and will be apparent to one skilled in the art.

What is claimed is:

1. A data storage drive comprising:
   a storage disk partitioned into a plurality of zones;
   a read/write head, the read/write head operative to read data from and write data to the storage disk at a plurality of data transfer rates;
   an oscillator circuit adapted to operate at one of a plurality of reference frequencies when the data storage drive is in operation; and
   signal processing circuitry in signal communication with the read/write head, the signal processing circuitry at least partially powered by a variable voltage source which dynamically varies a supply voltage to the signal processing circuitry as a function of a current one of the data transfer rates of the read/write head and a current one of the reference frequencies of the oscillator circuit;
   wherein the supply voltage to the signal processing circuitry is at least partially determined as a function of respective values obtained by addressing at least first and second lookup tables;

wherein the first lookup table relates the supply voltage for the signal processing circuitry to respective ones of the plurality of zones; and wherein the second lookup table relates the supply voltage for the signal processing circuitry to respective ones of the plurality of reference frequencies of the oscillator circuit.

2. The data storage drive of claim 1, wherein the data storage drive comprises a hard disk drive.

3. The data storage drive of claim 1, wherein the signal processing circuitry runs at a frequency substantially equal to the current data transfer rate.

4. The data storage drive of claim 1, wherein the oscillator circuit comprises a ring oscillator.

5. The data storage drive of claim 1, wherein each of the plurality of zones defines a respective annular region on a surface of the storage disk.

6. The data storage drive of claim 1, wherein the variable voltage source comprises a programmable voltage source.

7. The data storage drive of claim 1, further comprising a microprocessor, the microprocessor at least partially controlling the supply voltage provided by the variable voltage source to the signal processing circuitry.

8. The data storage drive of claim 1, wherein one or more entries in at least one of the lookup tables are determined at least in part by modeling the signal processing circuitry.

9. The data storage drive of claim 1, wherein one or more entries in at least one of the lookup tables are determined at least in part by modeling the oscillator circuit.

10. The data storage drive of claim 1, wherein the value obtained by addressing the first lookup table represents a worst case voltage.

11. The data storage drive of claim 1, wherein the value obtained by addressing the second lookup table represents a voltage bias term.

12. The data storage drive of claim 1, wherein the supply voltage is based at least in part on a difference between the value obtained by addressing the first lookup table and the value obtained by addressing the second lookup table.

13. A data storage drive comprising:
a storage disk;
a read/write head, the read/write head operative to read data from and write data to the storage disk at a plurality of data transfer rates; and
signal processing circuitry in signal communication with the read/write head, the signal processing circuitry at least partially powered by a variable voltage source which dynamically varies a supply voltage to the signal processing circuitry as a function of a current one of the data transfer rates of the read/write head;
wherein the supply voltage to the signal processing circuitry is at least partially determined by addressing one or more lookup tables;
wherein the storage disk is partitioned into a plurality of zones and at least one of the one or more lookup tables relates a supply voltage to respective ones of the plurality of zones;
wherein one or more entries in the at least one of the one or more lookup tables that relates the supply voltage to respective ones of the plurality of zones are determined at least in part by modeling the signal processing circuitry.

14. The data storage drive of claim 13, further comprising an oscillator circuit adapted to operate at a reference frequency when the data storage drive is in operation, wherein the supply voltage for the signal processing circuitry is further a function of the reference frequency of the oscillator circuit, and wherein the one or more lookup tables correspond to respective reference frequencies of the oscillator circuit.

15. The data storage drive of claim 13, wherein at least one of the one or more lookup tables is at least partially implemented in firmware in the data storage drive.

16. The data storage drive of claim 13, wherein at least one of the one or more lookup tables is at least partially implemented in software in the data storage drive.

17. A data processing system comprising a data storage drive, the data storage drive comprising:
a storage disk partitioned into a plurality of zones;
a read/write head, the read/write head operative to read data from and write data to the storage disk at a plurality of data transfer rates;
an oscillator circuit adapted to operate at one of a plurality of reference frequencies when the data storage drive is in operation; and
signal processing circuitry in signal communication with the read/write head, the signal processing circuitry at least partially powered by a variable voltage source which dynamically varies a supply voltage to the signal processing circuitry as a function of a current one of the data transfer rates of the read/write head and a current one of the reference frequencies of the oscillator circuit;
wherein the supply voltage to the signal processing circuitry is at least partially determined as a function of respective values obtained by addressing at least first and second lookup tables;
wherein the first lookup table relates the supply voltage for the signal processing circuitry to respective ones of the plurality of zones; and
wherein the second lookup table relates the supply voltage for the signal processing circuitry to respective ones of the plurality of reference frequencies of the oscillator circuit.

18. The data processing system of claim 17, wherein the variable power source is implemented in an integrated circuit that at least partially implements the signal processing circuitry.

19. The data processing system of claim 17, wherein the variable power source is external to an integrated circuit that at least partially implements the signal processing circuitry.

20. A method of operating a data storage drive, the method comprising the steps of:
determining the current data transfer rate of a read/write head, the read/write head operative to read data from and write data to a storage disk of the data storage drive; and
adjusting a variable supply voltage applied to signal processing circuitry of the data storage drive as a function of the determined current data transfer rate of the read/write head and a current one of a plurality of reference frequencies of an oscillator circuit adapted to operate at one of the plurality of reference frequencies when the data storage drive is in operation;
wherein the supply voltage to the signal processing circuitry is at least partially determined as a function of respective values obtained by addressing at least first and second lookup tables;
wherein the first lookup table relates the supply voltage for the signal processing circuitry to respective ones of a plurality of zones into which the storage disk is partitioned; and
wherein the second lookup table relates the supply voltage for the signal processing circuitry to respective ones of the plurality of reference frequencies of the oscillator circuit.

* * * * *